H. R. STRATFORD AND E. SCHEUER.
PROCESS AND APPARATUS FOR MANUFACTURING HOLLOW RUBBER ARTICLES.
APPLICATION FILED SEPT. 19, 1919.
1,401,567.
Patented Dec. 27, 1921.
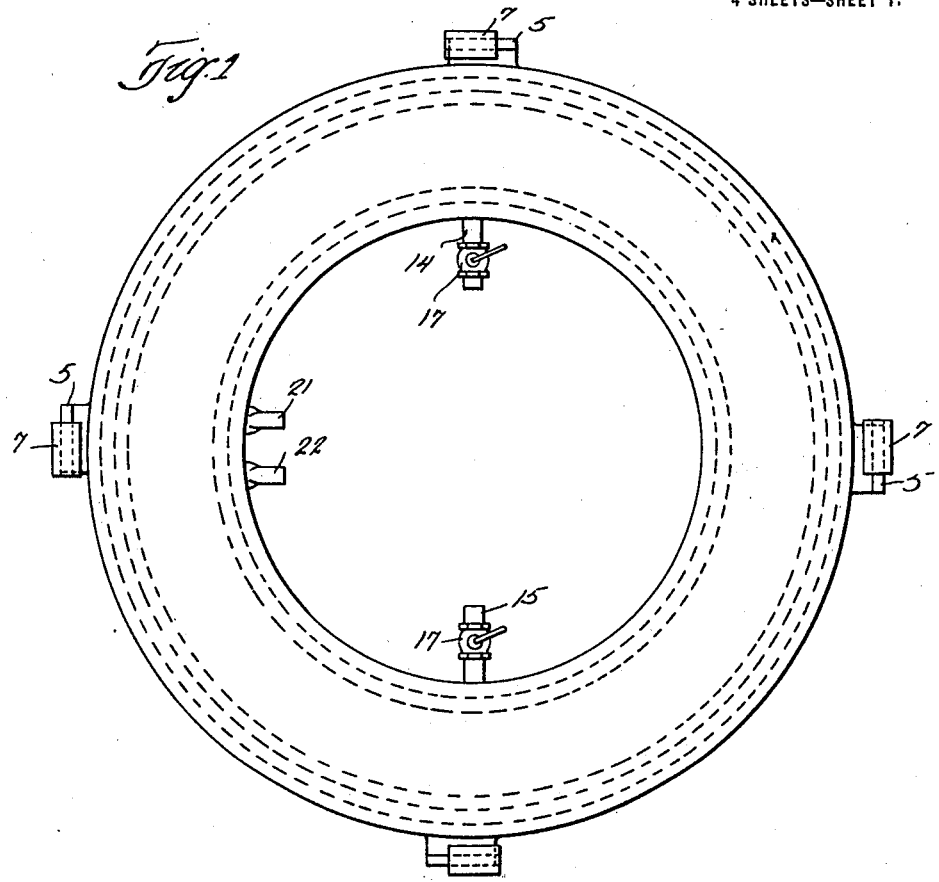
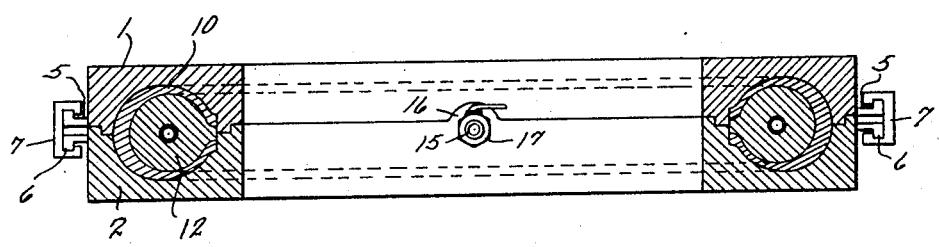

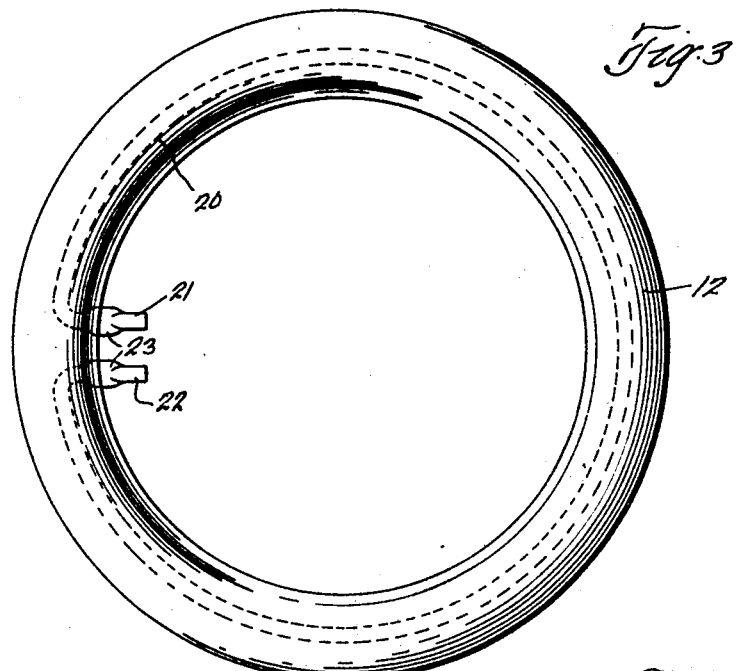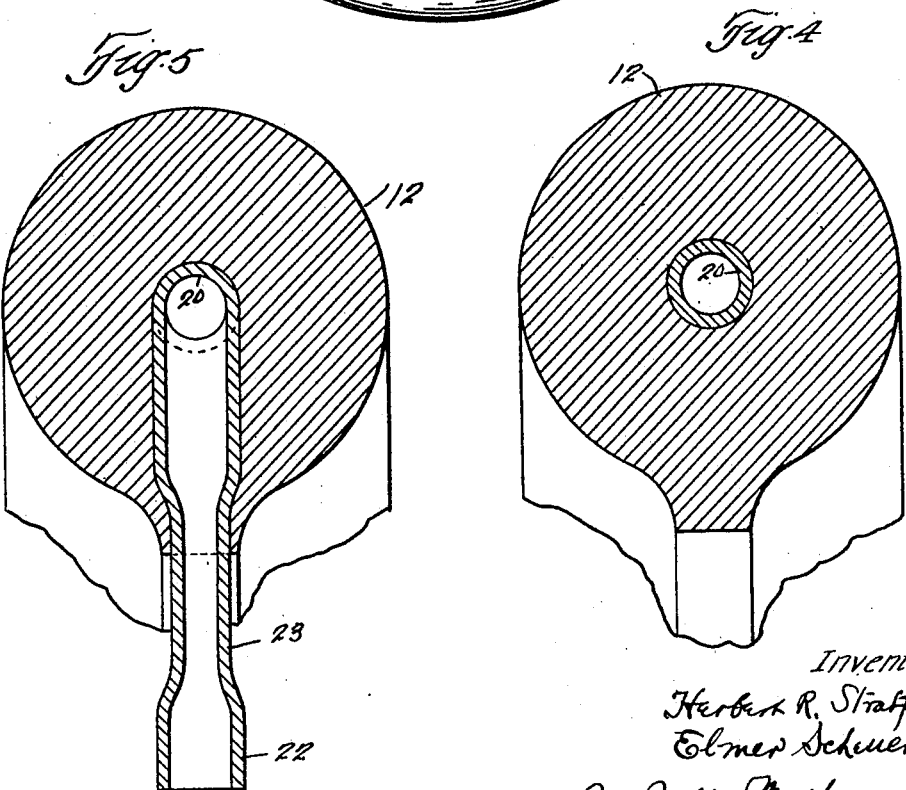

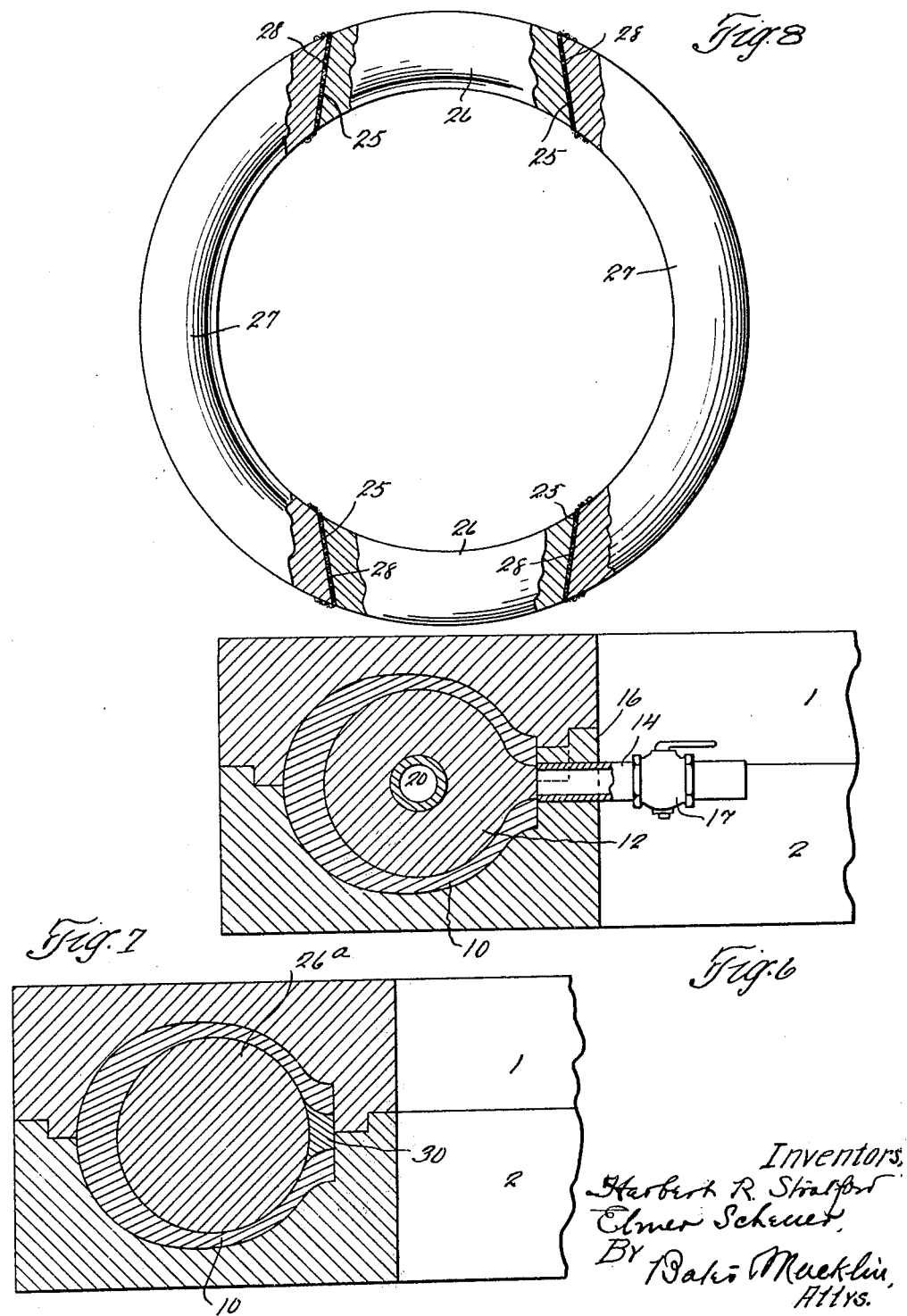

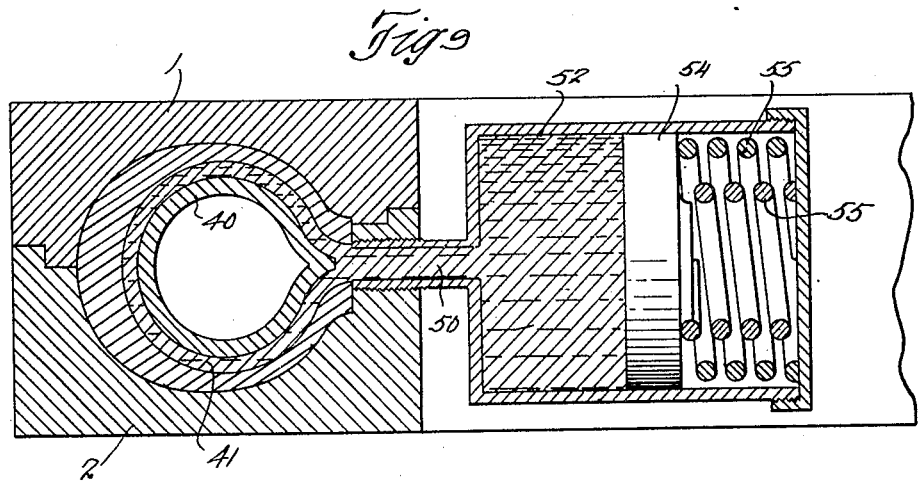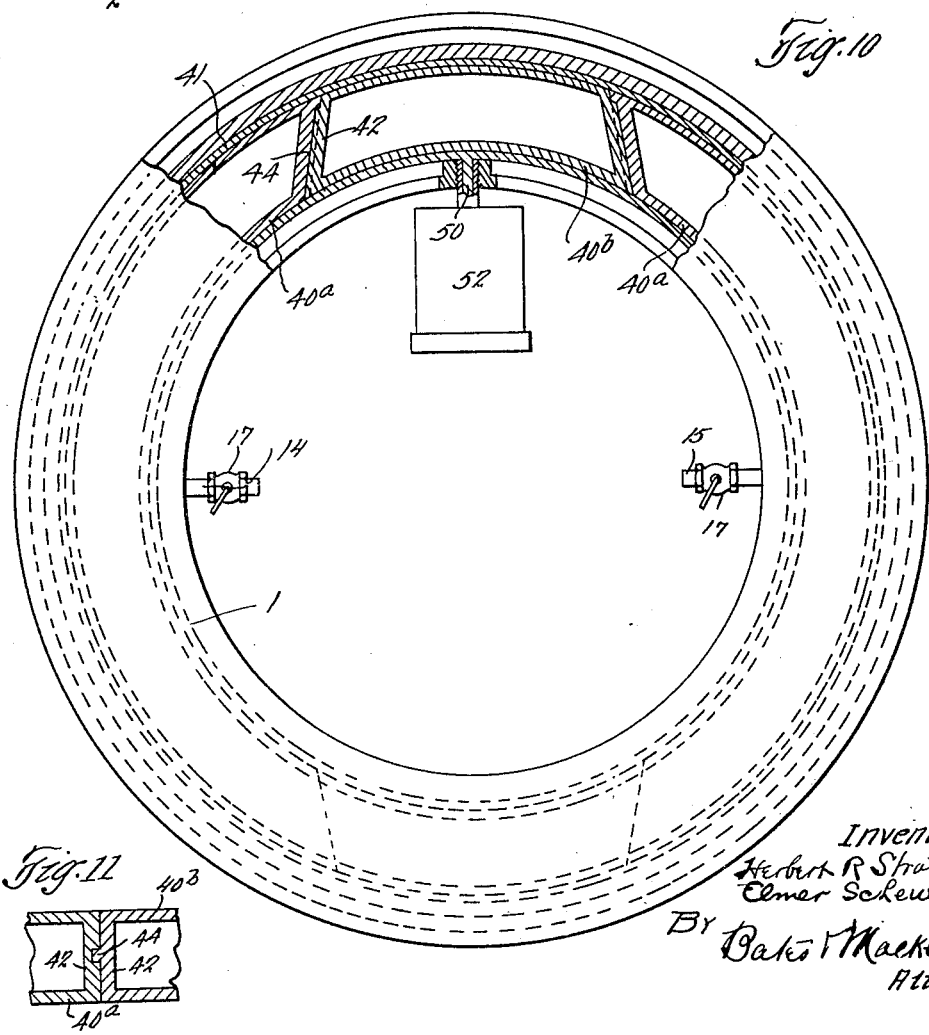

UNITED STATES PATENT OFFICE.

HERBERT R. STRATFORD AND ELMER SCHEUER, OF CLEVELAND, OHIO.

PROCESS AND APPARATUS FOR MANUFACTURING HOLLOW RUBBER ARTICLES.

1,401,567. Specification of Letters Patent. Patented Dec. 27, 1921.

Application filed September 19, 1919. Serial No. 324,796.

*To all whom it may concern:*

Be it known that HERBERT R. STRATFORD and ELMER SCHEUER, residing at Cleveland, in the county of Cuyahoga and State of Ohio, have invented a certain new and useful Improvement in Processes and Apparatus for Manufacturing Hollow Rubber Articles, of which the following is a full, clear, and exact description, reference being had to the accompanying drawings.

In the manufacture of rubber articles it is frequently necessary to provide means for causing outward pressure within an article confined in a mold during vulcanization. An object of this invention is to provide a simple economical process adapted to be easily carried out to attain this pressure.

In making certain rubber articles it is desirable to have a rigid core over which the article may be formed, and a further object of the invention is to provide such a core which shall be adapted both for the forming of the article and for automatic application of internal pressure during vulcanization.

Our invention contemplates the use of cores which may be previously formed, preferably by casting, and composed of a material adapted to fuse below the usual vulcanizing temperature whereby an internal pressure may be created and applied to the article, equally in all directions, consequent upon the application of heat for vulcanization.

Our invention eliminates many of the objections to the methods and means now used for creating internal pressure, and avoids difficulties incident to the use of the present cores, and has many advantages apparent from the following description.

The invention hereof is illustrated as embodied in a process for the manufacture of pneumatic tire casings and its essential characteristics are summarized in the appended claims.

Referring to the drawings, Figure 1 is a plan of a mold for a pneumatic tire casing showing our tire core therein as during vulcanization; Fig. 2 is a transverse section of the same; Fig. 3 is a plan of a core removed from the tire; Fig. 4 is a transverse section on an enlarged scale through such a core; Fig. 5 is a similar section taken at another point to show an inlet passage for a heating fluid; Fig. 6 is a transverse section through the mold, tire and core assembled, illustrating an outlet passage; Fig. 7 is the similar section through a mold, tire and core, wherein the core is of a slightly modified form; Fig. 8 is a plan partly in section showing still another modified form of core: Fig. 9 is a transverse section through the mold, tire and core, assembled, showing a device for creating pressure on the core when melted, and illustrating still another modified form of core; Fig. 10 is a sectional plan of the same showing a portion of the top mold member removed; and Fig. 11 is a sectional detail of the inner shell 40.

While our invention is capable of use in connection with the manufacture of many kinds of hollow rubber articles, in order that it may be more clearly understood in connection with various uses it will now be described with reference to the accompanying drawings showing its use in the manufacture of tire casings.

In Figs. 1 and 2 are shown two co-acting mold members, 1 and 2, each having an annular cavity adapted to receive one-half of a tire casing. The mold members are preferably rabbeted together as shown and may be held by any suitable means, such for example, as outwardly extending tapered ribs 5 and 6 adapted to receive female wedges 7.

In one use of our process a tire casing may be built over a core 12 of metal or metal alloy or composition. This core is preferably made of metal alloy having the property of melting at a temperature at or below that of vulcanization, and capable of being cast to fit the inner surfaces of the casing and normally rigid under ordinary atmospheric temperatures. This core lends itself readily to the forming of the tire thereon and may remain within casing when the casing is placed in the molds, such as 1 and 2, and when the molds, tire and core are subjected to the usual vulcanizing temperature within a suitable chamber or like apparatus, the core melts and expands with a very great force, thus actually compressing the rubber and other material of the casing, forcing it equally in all directions outwardly against the exterior mold.

The core may be removed while still in its melted state by allowing it to flow out of the casing, preferably before removing the casing from the mold. For this purpose we have illustrated in the drawings at 14 and 15 pipes extending through the mold to the core and each having valves 17 which may be opened, the one forming a vent and the other an outlet from which the melted material of the core may flow. The inner ends of these pipes meet the core at points between the beads of the tire, and it is obvious that any suitable number of them may be provided. As the material flows from one or both of these pipes it is received in a suitable container so that it may be saved, melted and recast into core.

In order to hasten the melting of the core and insure the vulcanizing heat being applied equally well to the interior and exterior of the casing we may provide a passage extending around the core through which heating fluid, such as live steam, may be passed. A convenient means for accomplishing this is illustrated particularly in Figs. 3 and 4 and 5, where we have shown a tube of metal as at 20, having a very much higher fusing point than the material of the core. This tube is preferably made of copper or iron and formed without seams so that it may be conveniently curved to lie substantially along the circumferential axis of the core 12, the ends being turned inwardly as at 23, and flattened to pass readily between the bead portions of the casing. During vulcanization steam connections may be fitted to the open ends 21 and 22 and live steam passed through the tube 20 thus hastening the fusing and applying the heat more quickly to the interior of the casing. It will be seen that the special metal alloy of the core may be readily cast about tube 20 to the form shown in Figs. 3, 4 and 5, and the casing may then be built over this core and placed in the vulcanizing molds with the projecting ends 21 and 22 extending inwardly from the inner periphery of the mold, permitting ready attachment of steam connections. The core may be removed by pouring it while hot from the mold as heretofore described.

The core shown in Fig. 8 comprises a plurality of sections adapted to be removed from the casing while in the rigid state. As shown this core is an annulus having substantially the same cross-section as the cores above described and being also divided as at 25 along planes which form an acute angle with relation to radial lines, whereby the comparatively short sections 26 may be drawn inwardly from the casing, after which the sections 27 may be readily removed. At 28 we have shown separators preferably of heavy fabric between the adjacent ends of the sections. In using this core the sections are preferably cast separately and then placed together with the separators 28 in position, and when the core and casing are placed in the vulcanizing mold the subsequent fusing of the core may cause it to expand and create the internal pressure desired. When this metal is fused the several sections cannot unite for the reason that the separators prevent the metal flowing together across the joints. The core may be allowed to harden before removal and may be reused.

To facilitate the use of this core many times without recasting it in a mold for that purpose we may use a closure strip 30 (Fig. 7) at the bead portion of the tire whereby the core itself may be circular in cross-section. In this figure the core is indicated at 26ᵃ surrounded by the tire casing 10 in the usual mold members 1 and 2. This bead closure may be formed of flexible material, such as several layers of heavy fabric. In use it lies entirely around the inner periphery of the tire casing, and may be readily removed prior to the removal of the sections of the core. This closure strip may also be made of metal cut into sections after the manner of the sections of the core. The use of such a strip also has the advantage that the mold members 1 and 2 need not be so closely fitted as is required where the melted material of the core must be retained by the joint between the mold members.

To economize on the amount of material used in the cores and to render the core much lighter in weight than when cast solid we may form an inner core or shell of non-fusible material such as a metal fusing at a much higher temperature than that required for vulcanization and cast the material of the core around this inner core or shell. Such an arrangement is illustrated in Figs. 9, 10 and 11. Here the inner shell is indicated at 40 as so shaped in cross-section that it may leave a substantially uniform distance from its exterior to the interior of the casing. We may then cast the metal of the core around this shell as indicated at 41. In order to remove the core from the casing after vulcanization we arrange the non-fusible inner core in sections substantially as described in connection with the core shown in Fig. 8, that is; sections as at 40ᵃ and comparatively short sections 40ᵇ. The ends of these sections are shown as having transverse walls 42 preferably provided with a tongue and groove fitting 44 so that the sections of the shell may be readily positioned to form an annulus while still permitting the withdrawal of the short sections 40ᵇ inwardly. The fusible metal is first removed by pouring off through the pipes as at 14 and 15 to avoid difficulty in removing the sections.

In using various kinds of fusible materials or alloys and in the making of rubber articles of different characters the requirements as to the expansibility of the core when fused, by reason only of its inherent property of expansion, may be greatly simplified, or entirely avoided by the use of a pressure means connected with the core and adapted to act to force additional metal into the interior of the rubber article consequent upon the fusing of the core during vulcanization. As such an arrangement may be required more frequently where the comparatively inexpansible rigid inner core is used, we have illustrated in Figs. 9 and 10 a device for forcing additional melted material into the interior of the article as the core fuses. As will be seen from these figures a passage 50 leading to the opening between the tire beads may connect the cylinder-like chamber 52 with the interior of the tire. Within the cylinder is a movable piston 54 urged toward the passage 50 by any suitable means such as heavy springs 55. At the opposite side of the piston 54 the chamber is preferably entirely filled with the same metal as that of the fusible part of the core. Accordingly, as soon as this metal fuses the springs 55 may push the piston 54 inwardly forcing additional metal into the interior of the tire, thus creating the desired pressure without depending upon the inherent expansibility of the core.

From this it will be seen that even though the metal or alloy of the core is of a character not capable of appreciable expansion, under vulcanizing temperature, the desired pressure may be attained by the simple expedient of a chamber containing fluid with means for urging this fluid into the interior of the rubber article being vulcanized.

In carrying out our invention we wish it to be understood that we contemplate the use of any substance or composition rigid under ordinary temperatures, but adapted to flow when subjected to pressure under the heat of vulcanization, and when we use an inner core or shell this core may be of any substance or material not subject to appreciable change under the treatment given the article being manufactured and which shall not change its form when the heated material surrounds the same.

In making any of the forms of cores used in carrying out our invention we prefer to use a metal or alloy fusible at or below the usual vulcanizing temperature. Such materials may consist of compositions of lead, tin, bismuth and cadmium. Other compositions fusing at a somewhat higher temperature may be used omitting the tin and cadmium. For example, a composition of lead 58 per cent. and bismuth 42 per cent. fuses sufficiently below vulcanizing temperature to attain successful results. Other compositions which may be selected for various uses to which this invention may be put, are as follows: bismuth 50 per cent; lead 25 per cent; tin 12½ per cent. and cadmium 12½ per cent. This composition has been found to fuse between sixty and seventy degrees centigrade and has a slight expansion, whereby when confined during vulcanization of the article, it may create an internal pressure on the article. A composition of bismuth 50 per cent., tin 27½ per cent., and cadmium 22½ per cent. has similar properties, except that it fuses at a slightly higher temperature than the latter composition.

It has been found that the use of a fusible core greatly facilitates the manufacture of many rubber articles in that the difficulties of vulcanization are largely eliminated, and it is within the spirit of our invention to provide an expansible fusible core for a hollow rubber article which shall be capable of expansion relative to the required pressure, so that consequent upon attaining a vulcanizing temperature this pressure is delivered equally in all directions to the article. Our invention also includes the removal of this core either in its melted, or solid state in the form of the interior of the article, or in sections as the nature of the article may require. For example, in the manufacture of various articles, having an opening when finished, and having a solid wall, thick compared to that of a hot water bag, the expansion of the article may be precisely proportional to the heat applied, so that the desired pressure may be attained upon the application of the required vulcanizing heat.

We claim—

1. A core for use in the manufacture of hollow rubber articles consisting of metal cast to a form to fit the interior of the article and arranged in sections separated by sheets of fabric, the core being adapted to melt when vulcanizing temperature is applied to the article.

2. The process of manufacturing hollow rubber articles including placing a core within the article of a material adapted to fuse when vulcanizing temperture is applied to the article confining the exterior of the article, then applying vulcanizing heat, then removing the core in rigid sections.

3. The process of forming hollow rubber articles including forming a core of material adapted to melt when vulcanizing heat is applied to the article, placing the core within the article, and applying vulcanizing heat to the article and to the interior of the core.

4. A process for manufacturing hollow rubber articles including the use of a core within the article adapted to melt during vulcanization of the article, maintaining the core separated in sections while melted, allowing the core to harden and then withdrawing the sections.

5. A process of manufacturing hollow rubber articles, including placing the article over a rigid forming core of a material adapted to melt at comparatively low temperatures, confining the exterior of the article during vulcanization while the core is melted whereby internal pressure is created by the melting and expanding of the core, and removing the core after the walls of the article have become sufficiently set to retain their shape.

6. A core for use in the manufacture of hollow rubber articles consisting of a material normally rigid and adapted to melt when the article is treated by the application of heat, said core being cast in sections separated by non-fusible material whereby it may be removed in sections.

7. A core for use in the manufacture of hollow rubber articles consisting of a material normally rigid and adapted to melt when the article is treated by the application of heat, said core being cast in sections separated by thin layers of flexible non-fusible material whereby the core may be removed in sections.

8. A core for use in the manufacture of hollow annular rubber articles which consists of a metal adapted to fuse at a temperature sufficient to change the consistency of the rubber and an inner annular core about which the fusible material is cast, said inner core being of a comparatively non-fusible rigid material.

9. A core for use in the manufacture of a hollow rubber article consisting of a hollow inner annular shell comprising separable sections, each surrounded by a material adapted to melt at or below vulcanizing temperature, and cast about said hollow inner shell to provide an exterior surface complementary to the interior of the article.

10. A core for use in the manufacture of hollow rubber articles consisting of a hollow inner shell comprising relatively movable sections, and a coating for said shell of a material adapted to become fluid under pressure when subjected to vulcanizing heat.

11. A core for use in the manufacture of annular hollow rubber articles consisting of a metal cast in annular form to fit the interior of the article and adapted to melt when vulcanizing heat is applied to the article, and a passage leading through the interior of the core for admitting heating fluid.

12. A core for use in the manufacture of hollow rubber articles consisting of metal cast to a form to fit the interior of the article and arranged in sections separated by sheets of fabric, the core being adapted to melt when vulcanizing temperature is applied to the article.

13. In a device of the character described the combination of a core having rigid separable non-fusible portions, the surface portion of which may soften and flow when heat is applied, a pressure device connected therewith and adapted to contain fluid and a passage connecting said pressure device with said core whereby pressure may be applied to said fusible portion.

14. In a device of the character described the combination with the core having a surface adapted to fit the interior of an article and adapted to melt when vulcanizing heat is applied to the article, of a pressure device connected with the fusible part in the core and containing material of substantially the same characteristics as the fusible part of the core.

15. The combination with exterior molds for a hollow rubber article, of a normally rigid core therefor adapted to soften and flow when heat is applied, a pressure device adapted to urge material into the interior of the article, whereby the core may be caused to exert an expanding pressure during the process of vulcanizing the article.

16. The combination of a mold for the exterior of a hollow rubber article, of a normally rigid core adapted to fit the interior of said article, and a passage leading to the interior of the article, said core comprising a material adapted to soften and flow when heat is applied to the mold, articles and core, a means for forcing a material substantially the same as that of the core through said passage, said means becoming active consequent upon the melting of the core and in the passage.

17. The combination with exterior molds for a hollow rubber article, of a normally rigid core therefor adapted to soften when vulcanizing heat is applied, and means including a spring-actuated piston adapted to urge material into the interior of the article whereby the core may be caused to exert an outward pressure during the process of vulcanization of the article.

In testimony whereof we hereunto affix our signatures.

HERBERT R. STRATFORD.
ELMER SCHEUER.